Jan. 13, 1953   J. W. ORENDORFF   2,624,997
BEET HARVESTER

Filed April 9, 1945   4 Sheets-Sheet 1

Inventor:
John W. Orendorff,
By Paul O. Pippel
Attorney.

Jan. 13, 1953  J. W. ORENDORFF  2,624,997
BEET HARVESTER

Filed April 9, 1945  4 Sheets-Sheet 3

Inventor:
John W. Orendorff,
By Paul O. Peppel
Attorney.

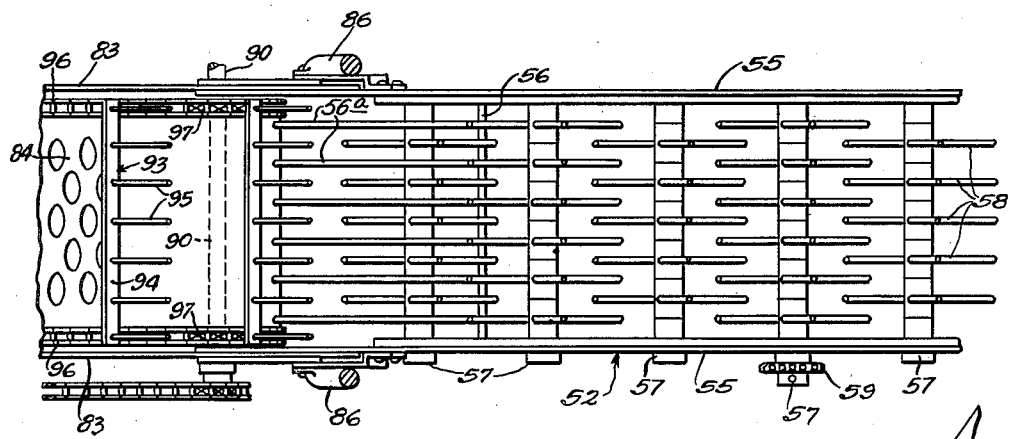
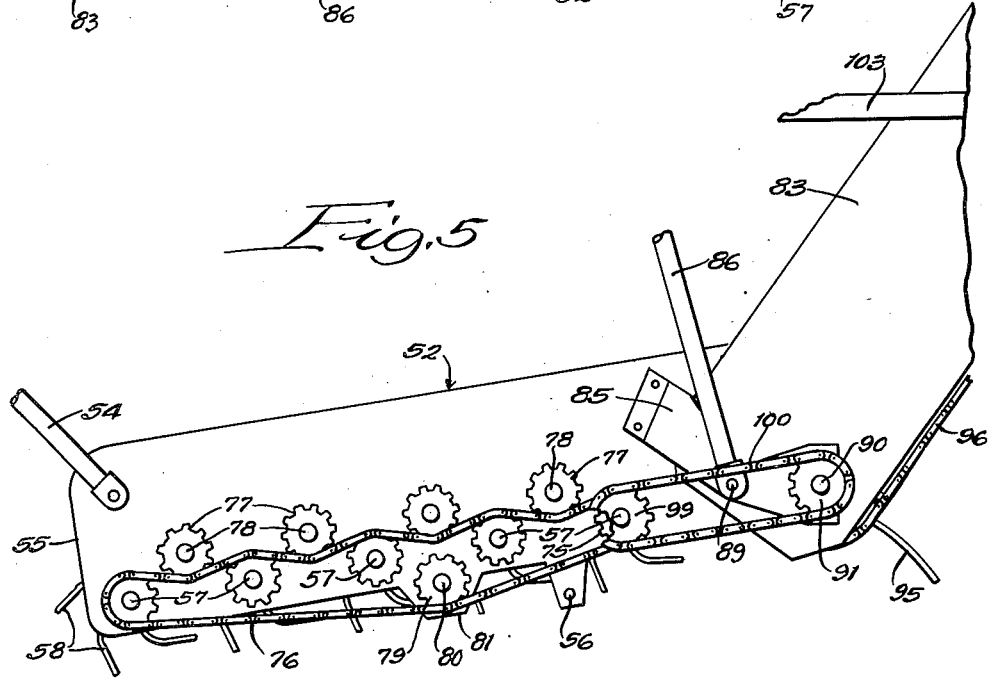

Patented Jan. 13, 1953

2,624,997

UNITED STATES PATENT OFFICE 2,624,997

BEET HARVESTER

John W. Orendorff, Canton, Ill., assignor to International Harvester Company, a corporation of New Jersey Application April 9, 1945, Serial No. 587,271

5 Claims. (Cl. 55—51)

This invention relates to agricultural implements and particularly to harvesters. More specifically, the invention relates to a harvester for beets and the like.

The beet harvester described herein includes a tractor which provides a mobile support for the harvester mechanism and supplies the motive power for propelling the machine across the field. The beet tops are removed by a mechanism mounted at the forward end of the tractor, whereupon the beets are separated from the soil by diggers and carried rearwardly by a conveyor. The beets are then delivered to an elevator which carries the beets upwardly and rearwardly and drops them into a truck connected to the tractor to trail therebehind. The truck is of the dumping type, and power for operating the topper, conveyor, elevator, and truck is supplied by the tractor.

In order to properly discharge beets into the truck the mouth of the elevator must, of course, be reasonably close thereto, and when manipulating the truck it is important that clearance be provided for the elevator to prevent interference with the truck. It should also be noted that the elevator of an agricultural harvester is generally bulky and heavy, and the distribution of its weight is an important factor in the proper operation of the harvester.

An object of the present invention is the provision of an improved beet harvester.

Another object is to provide an agricultural machine comprising a plurality of implement parts and power means for controlling the operation of these parts.

Another object is to provide, in combination with a tractor, a harvesting machine having a number of movable parts and power means operated by the tractor and controlled therefrom for manipulating said parts.

A further object is to provide in a harvester including a truck or other receptacle and an elevator for delivering material thereto, means for imparting translational movement to the elevator to bring it nearer to the tractor during operation of the truck, in order to avoid interference therewith, or to improve the distribution of weight during transport and the like.

Other objects and advantages will become clear from the following detailed description when read in conjunction with the accompanying drawings, wherein:

Figure 4 is a plan view from the right side of the tractor of the conveyor which delivers the beets to the elevator; and Figure 5 is a side elevation from the left side of the tractor of the conveyor showing the driving mechanism therefor.

Figure 1:
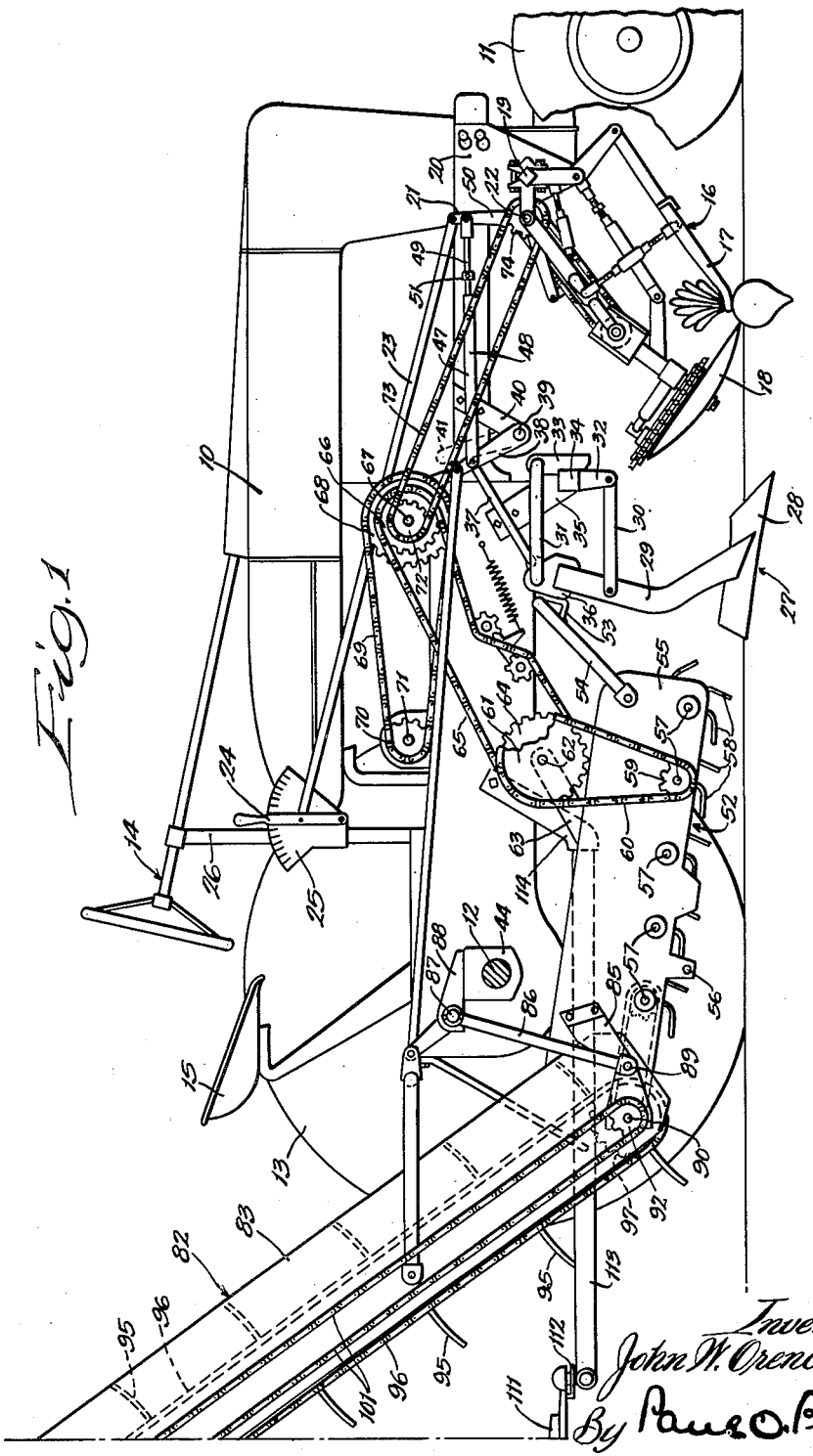
Figure 1 is a view in side elevation of a tractor with one rear wheel removed, showing a beet harvester embodying the features of the present invention attached thereto.

Referring to the drawings, numeral 10 designates the longitudinally extending body of a tractor having front wheels 11, a transverse rear axle 12, and rear wheels 13. The front wheels 11 are steerable from a steering mechanism indicated at 14 accessible to the operator's station 15.

Prior to separation of the beets from the soil and gathering them in the truck attached to the rear end of the tractor, the beets are topped; that is, the foliage growing from the top of the beet is severed and removed. This is accomplished by a mechanism shown attached to the front end of the tractor generally indicated by the numeral 16 and including a feeler gauge 17 and a revolving disk 18. This is the topping mechanism for the beets and will not be described in detail herein. The topping mechanism is supported upon a transverse tool bar 19 affixed to a plate 20 secured to the side of the tractor. The gauge 17 is adjusted with respect to the cutter disk by a mechanism including an arm 21 mounted upon a transverse shaft 22. A rod 23 connected to arm 21 has its other end connected to a lever 24 pivoted upon a quadrant 25 mounted upon the steering gear standard 26.

After the tops have been removed from the beets, the beets are separated from the ground by a digging mechanism generally indicated at 27. The digger includes digging blades 28 carried by a standard 29 supported at the rear ends of a pair of vertically spaced parallel links 30 and 31. The forward ends of the links are pivotally connected respectively to brackets 32 and 33 affixed to a transverse tool bar 34 supported by a bracket 35 mounted upon the side of the tractor. The upper parallel link 31 has its rear end pivotally mounted in a bearing 36 to which is attached a link 37, the other end of which is connected to an arm 38 secured to a transverse shaft 39. Shaft 39 is supported by one or more brackets 40 attached to the side of the tractor. Shaft 39 extends transversely of the tractor and to the other side thereof, and is provided at its other end with an arm 41 indicated in dotted lines in Figures 1 and 3.

Figure 3:
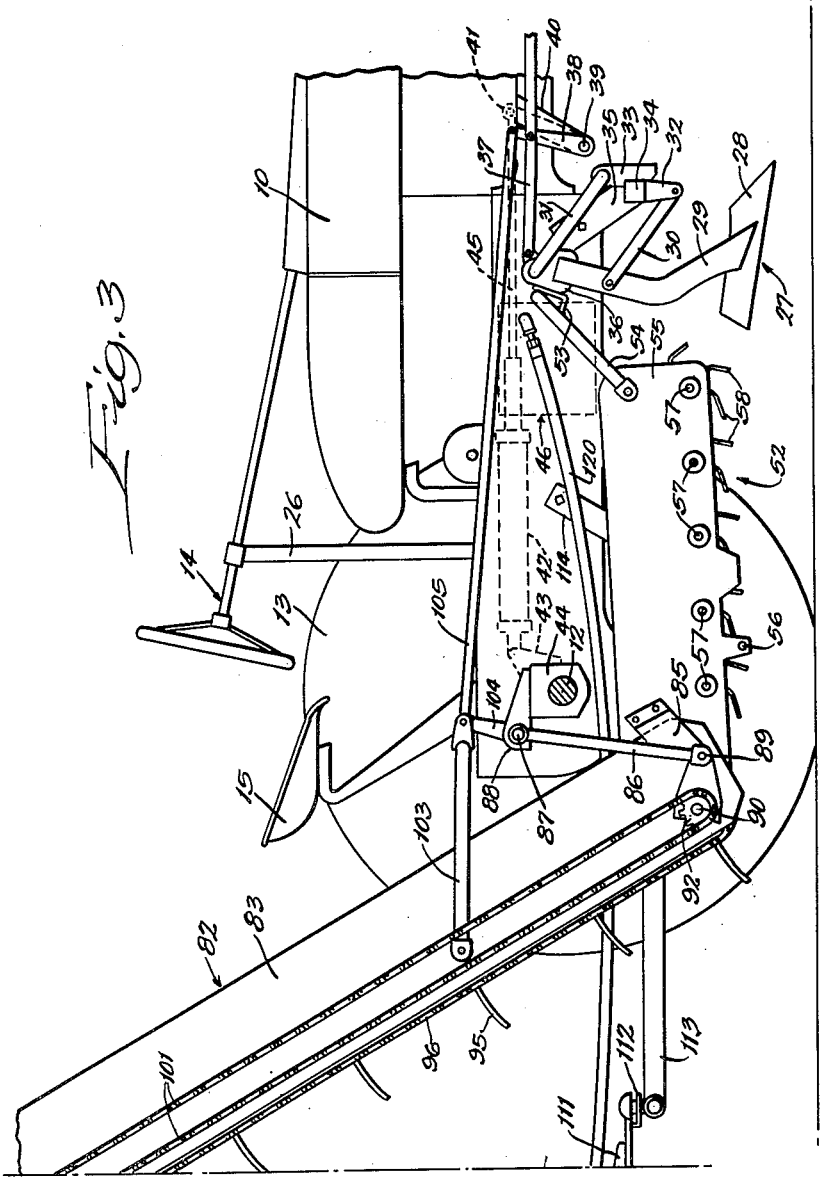
Figure 3 is a view in side elevation similar to Figure 1, showing only the rear portion of the tractor with the implement parts in raised position.

Referring particularly to Figure 3, it will be noted that shaft 39 and, therefore, arms 38 and 41 mounted thereon are rocked in a generally forward and rearward direction by a power lift mechanism including a hydraulic cylinder 42 anchored at one end upon a bracket 43 secured to the housing 44 for the rear axle 12. Cylinder 42 has a piston 45 connected to the arm 41 to effect forward and rearward rocking movement thereof. The cylinder 42 is preferably a double-acting hydraulic cylinder receiving fluid under pressure from an oil pump indicated at 46. Mechanism, not shown, may be provided at a location accessible to the tractor operator for controlling the operation of the cylinder.

In Figure 1 it will also be observed that a link in the form of a telescoping member 47 includes a sleeve 48 attached to the arm 38 and a shaft 49 attached to an arm 50 affixed to the transverse shaft 22. Shaft 49 is also provided with a collar 51 for abutment against the end of sleeve 48. Rocking of shaft 22, by movement of arm 50, causes the topping mechanism to move vertically to and from operating position. This is accomplished by the hydraulic cylinder shown in Figure 3, operating through arms 41 and 38 and transmitting motion through member 47 to arm 50 secured to the shaft 22. It will also be noted that through the connection of link 37 with arm 38 that the digging mechanism 27 will likewise be moved vertically to and from operating position substantially simultaneously with movement of the topping mechanism. However, due to the telescoping of link member 47 and the position of collar 51 the topping mechanism 16 is permitted a limited amount of free floating movement.

Upon separation of the beets from the soil by the digging mechanism 27, they are carried upwardly due to the disposition and angle of penetration of the blades 28 and are received by a conveyor mechanism generally indicated at 52. In order to support the conveyor 52 for movement to and from operating position, a bracket 53 is provided on the rear of bearing 36, and secured to bracket 53 are arms 54, shown in Figures 3 and 5, the lower ends of which are pivotally connected to the forward ends of a pair of laterally spaced, longitudinally extending plates 55 clearly shown in Figure 4. A spacer bar 56 is provided between the plates at the lower portion thereof, and the plates are further spaced by transverse shafts 57, a number of which are situated at longitudinally spaced points in the lower portion of plates 55, as clearly shown in the drawings. Between the plates 55, the shafts 57 are provided with circumferentially spaced radially extending fingers 58, the fingers on adjacent shafts being interlaced to prevent contact therebetween and to provide support for beets carried thereover. By driving the shafts 57 and thus causing the fingers 58 to rotate in a counter-clockwise direction as viewed in Figure 1, the beets are carried rearwardly to an elevator hereinafter to be described. Fingers 56ᵃ are provided on bar 56 which extend rearwardly beyond the rearmost shaft 57 and prevent beets falling through between the cleaner and the elevator. The shafts 57 are driven by a mechanism including a sprocket wheel 59, drivingly connected by a chain 60 to a sprocket 61 mounted upon a transverse shaft 62, rotatably mounted in the upwardly projecting end of bracket 63 affixed to one of the plates 55. Another sprocket 64 mounted on shaft 62 is driven by a chain 65 trained around a sprocket 66 carried by a shaft 67 mounted upon the side of the tractor. Shaft 67 also carries a larger sprocket 68 which is drivingly connected by a chain 69 to a smaller sprocket 70 carried by a power take-off shaft 71, driven by the tractor power plant. Drive is thus transmitted from sprocket 70 through shafts 67 and 62 to sprocket 59 mounted upon one of the shafts 57.

At this point it may also be noted that shaft 67 carries another sprocket 72 which is drivingly connected by a chain 73 to a sprocket 74 mounted on the shaft 22. Drive is transmitted from sprocket 74 to rotate cutter disk 18 through a mechanism which, per se, forms no part of this invention. A description thereof may be found in United States Patent No. 2,458,795.

On the inner ends of each of the shafts 57 there are keyed sprockets 75 (see Figure 5) having trained therearound an endless chain 76. The upper course of chain 76 is maintained in engagement with the upper portion of sprockets 75 by idler sprockets 77 on shafts 78 mounted upon the inner plate 55, one of the sprockets 77 being placed between each pair of sprockets 75. The lower course of chain 76 is held out of contact with the sprockets intermediate the end sprockets by another sprocket wheel 79, on a stub shaft 80 rotatably mounted in an extension 81 projecting downwardly from left-hand plate 55. Drive is thus transmitted from sprocket 59 to sprockets 75 to rotate the shafts 57 in a counter-clockwise direction, as viewed in Figures 1 and 3. The beets dug by the blades 28 and received by the conveyor 52 are thus carried rearwardly by the fingers 58, and it should be clear that the action of fingers 58 is such that the beets will be bounced up and down or shaken as they are conveyed rearwardly, so that dirt adhering thereto is loosened and drops downwardly. Conveyor 52 thus functions as a combined shaker and conveyor.

Figure 2:
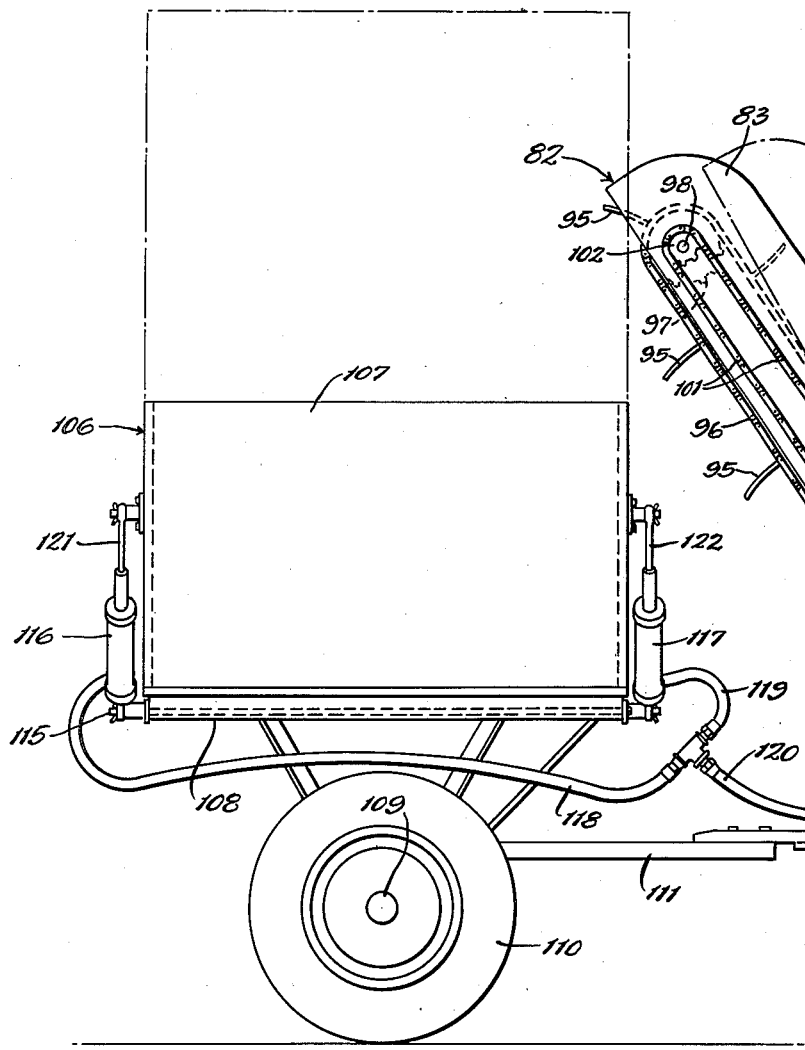
Figure 2 is a continuation of Figure 1 and shows the upper end of the elevator and its relationship to the dump truck attached to the rear end of the tractor to receive harvested vegetables.

The beets conveyed rearwardly by the shaker 52 are received by an elevator generally indicated at 82. Conveyor 82 includes laterally spaced side walls 83, and a foraminated bottom 84, through which foreign material may be passed as the beets are advanced by the elevator. Elevator 82 is secured to the sides 55 of the shaker 52 by laterally spaced straps 85 secured to the outside of the side walls 83 and to the laterally spaced side plates 55 of the shaker 52. The elevator 82 extends upwardly and rearwardly, and the lower end thereof and the rear end of the conveyor are supported by an attaching member in the form of laterally spaced links 86, pivoted upon a transverse shaft 87 mounted in a bracket 88 affixed to the rear axle housing 44. These links 86 on opposite sides of the elevator extend downwardly, and the lower ends thereof are pivotally connected at 89 to straps 85 forming a cradle in which the elevator is supported. While the connection of straps 85 to the plates 55 on conveyor 52 is rigid, the connection thereof to the side walls 83 of the conveyor 82 is a pivotal one, the straps being mounted upon a transverse shaft 90 extending through the lower portion of the side walls 83 of the conveyor, shaft 90 serving as the point of connection about which the elevator swings as a pivot. The inner end of the shaft 90 is provided with a sprocket 91, and the outer end thereof has keyed thereto a sprocket 92. These serve to drive the elevating mechanism 93, clearly shown in Figure 4, and including spaced transverse members 94 to which are secured outwardly projecting fingers 95. The ends of members 94 are carried upon laterally spaced endless chains 96 trained around sprockets 97 keyed to the shaft 90 between the walls 83. The upper ends of the chains 96 are trained around sprockets 97 mounted upon a transverse shaft 98 between plates 83 at their upper ends as shown in Figure 2. In order to transmit drive to the elevator mechanism, an additional sprocket 99 is provided on the inner end of the shaft 57 at the rear of conveyor 52. This sprocket is drivingly connected by a chain 100 to the sprocket 91 on the inner end of shaft 90. Sprocket 92 is drivingly connected by a chain 101 to a sprocket 102 on the shaft 98.

The lower portion of the elevator 82 is supported upon the transverse shaft 90 for pivotal movement with respect thereto. Such pivotal movement is imparted to the elevator by mechanism including laterally spaced links 103, one of which is pivotally connected to each side of the elevator 82. These links extend forwardly, and their forward ends are connected to an upwardly extending arm 104 affixed to the shaft 87. Arm 104 is connected by a rod 105 to the lifting arm 38, so that upon lifting the beet topper 16, the digger 27, and the conveyor 52, the rod 105 is moved forwardly, rocking arm 104 in a clockwise direction and swinging elevator 82 forwardly about its pivot at 90. The lifting of the digger 27, of course, carries with it the front end of conveyor 52, and since the digger mechanism moves upwardly and forwardly in an arc, the conveyor mechanism similarly moves forwardly. Therefore, due to the pivotal mounting of link 86 upon the shaft 87, link 86 swings forwardly carrying the lower end of the elevator forwardly therewith.

It should thus be clear that the elevator not only swings forwardly about its pivot 90 when the harvester parts are lifted, but also has imparted thereto a translational movement in a generally forward direction, since the pivot 89 also moves forwardly. This is, of course, important when transporting the harvester, inasmuch as the weight of the elevator is more evenly distributed and better carried by the tractor if it is brought closer thereto.

Rearwardly of the elevator is positioned a self-supporting traveling receptacle in the form of a dump truck 106 which is in a position, as indicated in Figure 2, to receive beets discharged from the elevator 82. The dump truck 106 comprises generally a body 107 and a supporting frame 108 carried upon an axle 109 upon which are mounted wheels 110. The truck is also provided with a forwardly extending draft structure 111 pivotally connected at 112 for lateral swinging movement to a longitudinally extending draw-bar 113 secured to a bracket 114, as indicated in Figure 1, fastened to the side of the tractor.

As shown in Figure 2, the upper end of elevator 82 overlaps the side walls of the truck body 107 so that beets discharged from the upper end of the elevator will drop into the truck. While the details of construction of the truck 106 form no part of the present invention, it may be noted that it is a side delivery dump truck, and that the body 107 may be moved into the dotted line position shown in Figure 2 about its pivotal connection 115 to the frame 108. Dumping is accomplished by a pair of laterally spaced hydraulic cylinders 116 and 117, connected by flexible pipes 118 and 119 to a longitudinally extending pipe 120 connected as shown in Figure 3 to the pump 46 on the tractor to receive therefrom fluid under pressure in a manner, not shown, similar to cylinder 105, for actuating the cylinders 116 and 117. Cylinders 116 and 117 are anchored to the frame 108 and are provided with pistons 121 and 122 pivotally attached to the body 107 for dumping purposes.

As is clearly indicated in Figure 2, dumping of the truck 106 cannot safely be accomplished when the elevator 82 is in position for delivering beets thereto, since the parts are in danger of coming in contact and causing damage. Thus the pivotal movement of the elevator 82 serves the double purpose of bringing the elevator closer to the tractor to facilitate transport thereof and avoiding contact of the elevator and dump truck.

It should now be understood that a beet harvester has been described which has been provided with a novel mechanism for moving the parts to and from operating position and for actuating the operating mechanism thereof. While the invention has been described in its preferred embodiment, it should be understood that modifications may be made therein without departing from the spirit of the invention or the scope of the appended claims.

What is claimed is:

1. In a tractive agricultural machine having implement parts movable between operating and non-operating positions, a connecting member movably mounted on the machine, a part pivotally attached to said member for swinging movement with respect to the vehicle, a cylinder and piston on the machine, means deriving power from the machine for effecting movement of the piston in said cylinder, connecting means between the cylinder and said part to effect swinging movement thereof about its pivot, and separate connecting means between said cylinder and said connecting member for effecting simultaneous movement thereof relative to the machine.

2. In an agricultural crop harvester, in combination, a traveling support, crop-severing mechanism connected to the support, an elevator disposed rearwardly of the crop-severing mechanism for conveying severed crops upwardly and rearwardly, a receptacle disposed rearwardly of the elevator having a movable part and connected to the support in position to receive material discharged from the conveyor, means serving as a cradle pivoted on the support for swinging movement, means pivotally connecting the elevator to said cradle at a location removed from its pivot on the support, power means on the support, means connecting said power means and said receptacle for moving said movable part, and means connecting said power means and said elevator for swinging the elevator about its pivot, including means for simultaneously swinging said cradle about its pivot.

3. In an agricultural crop harvester, in combination, a traveling support, crop-severing mechanism connected to the support, an elevator disposed rearwardly of the crop-severing mechanism for conveying severed crops upwardly and rearwardly, a receptacle disposed rearwardly of the elevator having a movable part and connected to the support in position to receive material discharged from the elevator, means serving as a cradle pivoted on the support for swinging movement, means pivotally connecting the elevator to said cradle at a location removed from its pivot on the support, a hydraulic cylinder on the support, means connecting said cylinder to the elevator for swinging the latter about its pivot, including means for simultaneously swinging said cradle about its pivot, a hydraulic cylinder on said receptacle for moving said movable part, and means on the support for supplying fluid under pressure to both said cylinders.

4. An agricultural harvester comprising a traveling support, a crop-removing device carried by the support; an elevator for discharging the crops to a receptacle, and a conveyor carried by the support rearwardly of the crop-removing device for receiving the removed crops and delivering them to the elevator, means serving as a cradle suspended from the support for generally longitudinal movement with respect thereto, means connecting the elevator to the cradle for swinging movement relative thereto and to the support, and means for simultaneously swinging the elevator and the cradle in the same general direction, whereby translational movement is imparted to the elevator.

5. In an agricultural machine, in combination, a traveling support, a crop treating device mounted on the support for generally vertical movement with respect thereto, an elevator disposed rearwardly of the crop treating device for conveying treated crops upwardly and rearwardly, a receptacle attached to the support for material discharged from the elevator, means pivotally connecting the lower end of the elevator to the support for swinging movement of its upper end with respect thereto toward and away from the receptacle, a cylinder and piston on the support, means for supplying fluid under pressure to said cylinder to actuate the piston, means connecting the cylinder and piston to the crop treating device to effect vertical movement thereof, and means connecting the cylinder and piston to said elevator to effect swinging movement thereof about its pivot during movement of the crop treating device.

JOHN W. ORENDORFF.

REFERENCES CITED

The following references are of record in the file of this patent:

UNITED STATES PATENTS

| Number | Name | Date |
|---|---|---|
| 389,538 | Baker | Sept. 18, 1888 |
| 390,016 | Gilmore | Sept. 25, 1888 |
| 1,041,003 | Binder | Oct. 15, 1912 |
| 1,282,657 | Tussing | Oct. 22, 1918 |
| 1,813,967 | Siemiana | July 14, 1931 |
| 1,954,282 | Cahall | Apr. 10, 1934 |
| 2,060,688 | Pryor | Nov. 10, 1936 |
| 2,076,673 | Roper | Apr. 13, 1937 |
| 2,190,969 | Adams | Feb. 20, 1940 |
| 2,203,938 | Barrett | June 11, 1940 |
| 2,215,516 | Schooler | Sept. 24, 1940 |
| 2,293,757 | Jochumsen | Aug. 25, 1942 |
| 2,344,305 | Hyman et al. | Mar. 14, 1944 |
| 2,368,353 | Fulper | Jan. 30, 1945 |
| 2,384,623 | Kingsbury | Sept. 11, 1945 |

FOREIGN PATENTS

| Number | Country | Date |
|---|---|---|
| 426,247 | France | Apr. 27, 1911 |
| 137,468 | Great Britain | Jan. 15, 1920 |

OTHER REFERENCES

Advertising Circular entitled "Gar Wood Scrapers" published January 1941 by Gar Wood Industries, Detroit, Michigan, Bulletin R162.